Sept. 27, 1927.  H. F. ZOLLER  1,643,913
PRESERVED EGG AND PROCESS THEREFOR
Filed March 13, 1925
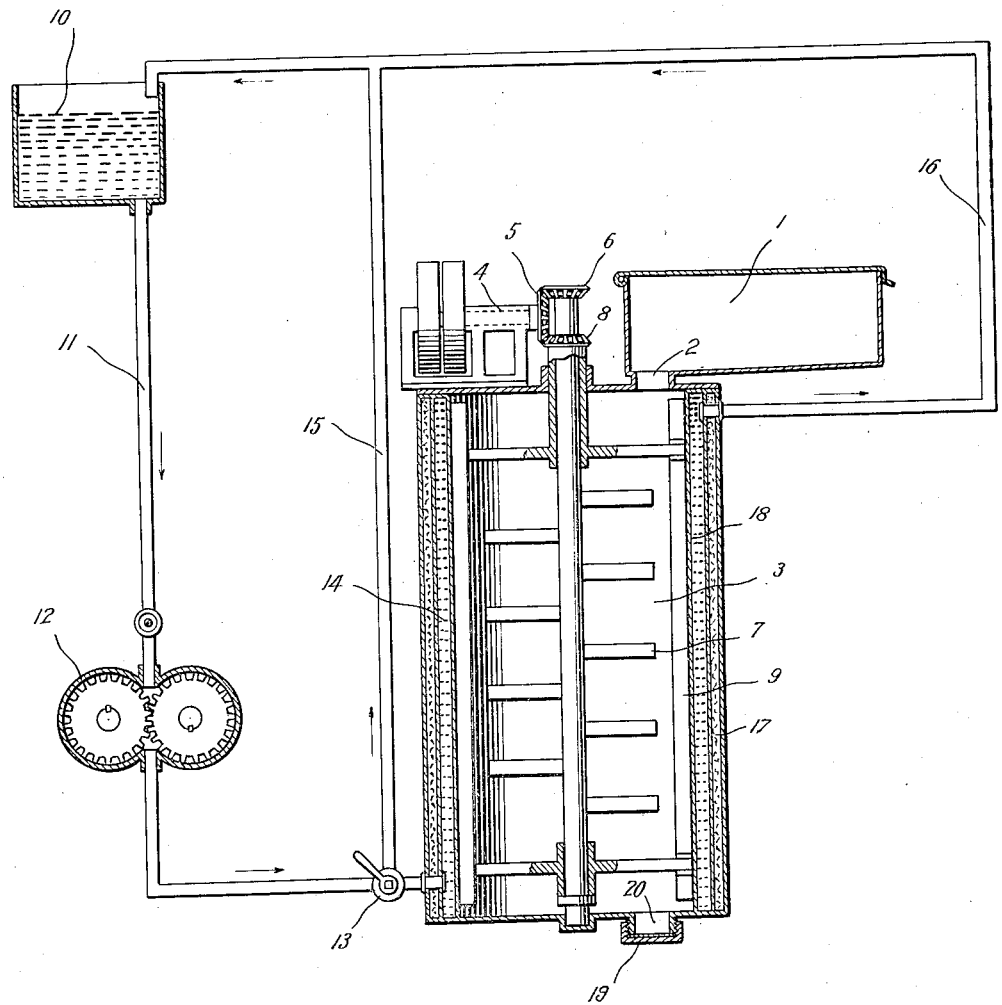
Inventor
Harper F. Zoller
By Frank H. Schmartz
Attorney Patented Sept. 27, 1927.

1,643,913

UNITED STATES PATENT OFFICE.

HARPER F. ZOLLER, OF DETROIT, MICHIGAN.

PRESERVED EGG AND PROCESS THEREFOR.

Application filed March 13, 1925. Serial No. 15,255.

This invention relates to preserved eggs and processes therefor and comprises all improvements over the prior art which are disclosed in this application. The primary object is to produce a superior frozen egg product which defrosts quickly to a relatively smooth thin condition, which can be easily put to its normal commercial uses in a manner similar to the way fresh unfrozen eggs are used. This object is attained in its maximum degree by mixing ethylene glycol with the egg product and also freezing the resultant mixed egg product by a new rapid process. This quick freezing process may of course, be used either with or without ethylene glycol or other conditioning agent. The quick freezing process comprises broadly, partially freezing the egg product while simultaneously mixing the same, and subsequently freezing to final condition without mixing.

The above and other objects which will hereinafter appear, are attained by improvements embodying new and useful features as disclosed in this application.

To enable others skilled in the art to so fully comprehend the essential features of the improvements that they may embody the same by the modifications contemplated by the improvements disclosed in this application, a drawing illustrating a preferred form has been annexed as a part of this disclosure.

The drawing illustrates a diagrammatic vertical sectional view of an apparatus suitable for carrying out the initial or partial freezing step of the process.

I propose to carry out my process on whole egg content, egg yolk, or egg white. While I may carry out my quick freezing process without any conditioning agent, or with something other than ethylene glycol, yet I prefer to use ethylene glycol.

It is well known, that when egg yolk or mixed whole egg is thawed out after being frozen, the thawed product has a thick glutinous consistency quite different from egg product which has never been frozen, and this glutinous product is more difficult to apply to the normal uses to which similar unfrozen egg product is ordinarily put. To overcome this deleterious effect of freezing, certain conditioning materials have been used.

From experiment in search of a more perfect and effective conditioning material, I have found ethylene glycol to be an exceptionally effective agent. It is an edible food product, and requires only a comparatively small percentage to preserve whole egg, egg yolk, or egg white, in the same smooth physical consistency after it has been thawed out, that it had previous to freezing. To secure excellent results with whole egg, or egg yolk, it is not necessary to use more than 1% to 2% of ethylene glycol. To preserve egg white, ½% to 1% of ethylene glycol is sufficient. This comparatively small percentage of non-egg material (ethylene glycol), supplies the egg product to the consumer in a more concentrated form than is true of sugar or glycerine. Also, ethylene glycol although being an edible material, serves to preserve the egg product without subsequent fermentation for a longer period while the consumer is using it. Also, ethylene glycol renders the egg product thinner when in fluid thawed out condition, than sugar or glycerine.

The egg product comprising whole egg, egg yolk, or egg white is placed in hopper 1, with or without a conditioning material such as ethylene glycol. The resultant mixture is allowed to run through opening 2, into freezing chamber 3 until chamber 3 is about three-quarters full. Shaft 4 is then rotated by any suitable power and bevel gear 5 on shaft 4 operates bevel gear 6 to rotate vane stirrer 7 in one direction and operates bevel gear 8 and scraper 9 in the reverse direction. This portion of the machine is similar to the ordinary ice cream freezer.

Preferably prior to introducing the egg material into chamber 3, brine from source 10 refrigerated by any suitable means to preferably 10° F. or colder, passes down pipe 11 to pump 12 which forces the brine to flow to valve 13 which may be set at such angle as to cause all the brine to enter brine chamber 14, or to cause part of the brine to return to source 10 through bypass pipe 15, or to cause all the brine to go through pipe 15. But for this process the valve 13 is set, to supply the desired amount of brine to maintain wall 18 of brine chamber 14 at the desired temperature, the brine circulating through pipe 16 back to source 10. Surrounding brine chamber 14 is suitable insulation material 17.

The rotation of stirrer 7 and scraper 9 in opposite directions, first serves to break up the egg yolks and thoroughly and intimately mix the egg material with or without the conditioning agent. The cold brine in chamber 14 rapidly extracts the heat from the egg material in contact with wall 18 of chamber 3. Scraper 7 continuously removes the chilled and partially frozen egg material from wall 18 while fresh unchilled egg material comes into contact with wall 18 as a result of the stirring action by parts 7 and 9. This process is continued preferably until considerable of the water (probably 25% to 50%) of the egg material is frozen into ice. But the process is preferably stopped before the egg material has been frozen beyond the flowable condition, in order that, by removing closure 19 from opening 20, the partially frozen egg contents of chamber 3 may flow down into the proper receptacle. This receptacle is then set in the refrigerating room which is preferably at a temperature between 0° F. and minus 25° F. The egg material now finishes freezing and passes to the solid non-flowable condition.

While the stirring and freezing machine is similar to an ordinary ice cream freezer, I have discovered by experiment that 160 revolutions per minute, which is the speed used in operating on ice cream, causes considerable foaming of the egg material. I find that when the speed is reduced to 90 to 100 R. P. M., satisfactory results are obtained without objectionable foaming.

By partially freezing the egg material while mixing same, the product contains much smaller crystals of ice, and is therefore of a much smoother consistency even when no conditioning material such as ethylene glycol is used. The product also defrosts much more quickly than the customary frozen egg products now in use. Also my quick process enables the egg material to be thoroughly frozen into the solid condition for marketing in less than a twenty-four hour period, whereas the process now in commercial use requires at least twice the length of time required in my process. Thus my process requires a less amount of space and labor in the handling, and is therefore less costly. At the same time my process allows less time for the unfrozen egg product to be in contact with the air and therefore less time for bacteria, yeast, and other microbes to act on the egg product to render it unsanitary and partially unfit for food purposes.

Without further elaboration, this disclosure will so fully reveal the gist of the improvements that others can, by applying current knowledge, readily vary these improvements without omitting certain features that, from the standpoint of the prior art, fairly constitute essential characteristics of the generic and specific aspects of these improvements, and therefore such variations are intended to be comprehended within the meaning and range of equivalency of the following claims.

I claim:

1. The process of preserving raw egg comprising, adding ethylene glycol to the raw egg, and freezing the resultant mixture.

2. The process of preserving raw egg comprising, adding ethylene glycol to the raw egg, and freezing the resultant mixture. the amount of ethylene glycol being sufficient to substantially prevent objectionable thickening of the raw egg when thawed.

3. As a new article of manufacture, frozen raw egg containing added ethylene glycol.

4. As a new article of manufacture, frozen raw egg containing added ethylene glycol in amount sufficient to substantially prevent objectionable thickening of the resultant egg product when thawed.

5. The process of preserving raw egg comprising, simultaneously mixing and chilling the raw egg until it reaches a temperature near or below the initial freezing point.

6. The process of preserving raw egg comprising, simultaneously mixing and chilling the raw egg until it reaches a temperature near or below the initial freezing point, and subsequently freezing the raw egg to final condition without mixing.

7. The process of preserving raw egg comprising, adding ethylene glycol to the raw egg, simultaneously mixing and chilling the resultant egg product until it reaches a temperature near or below the initial freezing point, and subsequently freezing the resultant egg product to final condition without mixing.

8. The process of preserving raw egg comprising, placing the raw egg in a mixing and freezing device, simultaneously mixing and partially freezing the raw egg, removing the partially frozen raw egg from said device before it has frozen beyond the flowable stage, and subsequently freezing the raw egg to final condition without mixing.

HARPER F. ZOLLER.